US012587243B2

(12) United States Patent
Jung et al.

(10) Patent No.: US 12,587,243 B2
(45) Date of Patent: Mar. 24, 2026

(54) APPARATUS AND METHOD FOR TRANSMITTING AND RECEIVING SIGNAL ACCORDING TO CHANNEL STATE IN WIRELESS COMMUNICATION SYSTEM

(71) Applicant: Samsung Electronics Co., Ltd., Gyeonggi-do (KR)

(72) Inventors: Geonwoong Jung, Gyeonggi-do (KR); Seunghyun Lee, Gyeonggi-do (KR); Juho Lee, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 306 days.

(21) Appl. No.: 18/451,395

(22) Filed: Aug. 17, 2023

(65) Prior Publication Data

US 2024/0063865 A1 Feb. 22, 2024

(30) Foreign Application Priority Data

Aug. 22, 2022 (KR) ........................ 10-2022-0104928

(51) Int. Cl.
*H04W 72/1263* (2023.01)
*H04B 7/06* (2006.01)
(52) U.S. Cl.
CPC ...... *H04B 7/0617* (2013.01); *H04W 72/1263* (2013.01)
(58) Field of Classification Search
CPC ........................ H04W 72/1263; H04B 7/0617
See application file for complete search history.

(56) References Cited

U.S. PATENT DOCUMENTS

| | | | |
|---|---|---|---|
| 10,305,561 B2 | 5/2019 | Baek et al. | |
| 11,101,863 B2 | 8/2021 | Kang et al. | |
| 11,528,657 B1 * | 12/2022 | Mangalvedhe ... | H04W 74/0833 |
| 2018/0351719 A1 * | 12/2018 | Lee ...................... | H04W 24/08 |
| 2019/0268053 A1 * | 8/2019 | John Wilson ........ | H04B 7/0634 |
| 2022/0070843 A1 * | 3/2022 | Levitsky ............ | H04B 7/06952 |
| 2022/0393756 A1 * | 12/2022 | Matsumura ........... | H04W 16/26 |
| 2023/0006764 A1 * | 1/2023 | Jiang ..................... | H04L 1/1893 |

(Continued)

FOREIGN PATENT DOCUMENTS

| | | |
|---|---|---|
| JP | 2022-045361 | 3/2022 |
| KR | 10-2016-0063020 | 6/2016 |

(Continued)

*Primary Examiner* — Kent Krueger
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as LTE. The disclosure provides a method performed by a UE. The method includes receiving mapping information between a combination of a reflection pattern and a transmission beam of a BS and an RS from the BS; receiving scheduling information including information on a channel state corresponding to the combination of the reflection pattern and the transmission beam of the BS; identifying a reception beam based on at least one RS received from the BS, the mapping information, and the scheduling information; and receiving a downlink signal from the BS through the reception beam. The reflection pattern is related to an RIS.

16 Claims, 12 Drawing Sheets

550

555

(56) References Cited

U.S. PATENT DOCUMENTS

| | | | |
|---|---|---|---|
| 2023/0107283 A1* | 4/2023 | Park | H04W 48/08 |
| | | | 370/329 |
| 2024/0146358 A1* | 5/2024 | Jung | H04B 7/0626 |
| 2024/0322882 A1* | 9/2024 | Rom | H04L 5/0057 |

FOREIGN PATENT DOCUMENTS

| | | |
|---|---|---|
| KR | 10-2019-0010507 | 1/2019 |
| WO | WO 2021/221183 | 11/2021 |
| WO | WO 2021/240699 | 12/2021 |
| WO | WO 2022/055943 | 3/2022 |

* cited by examiner

Slot 2 scheduling

<ACI field>
ACI state ID #0
Number of repeated slots of ACI state ID
0 = 0

Slot 3 scheduling

<ACI field>
ACI state ID #1
Number of repeated slots of ACI state ID
1 = 1

Slot 4 Scheduling

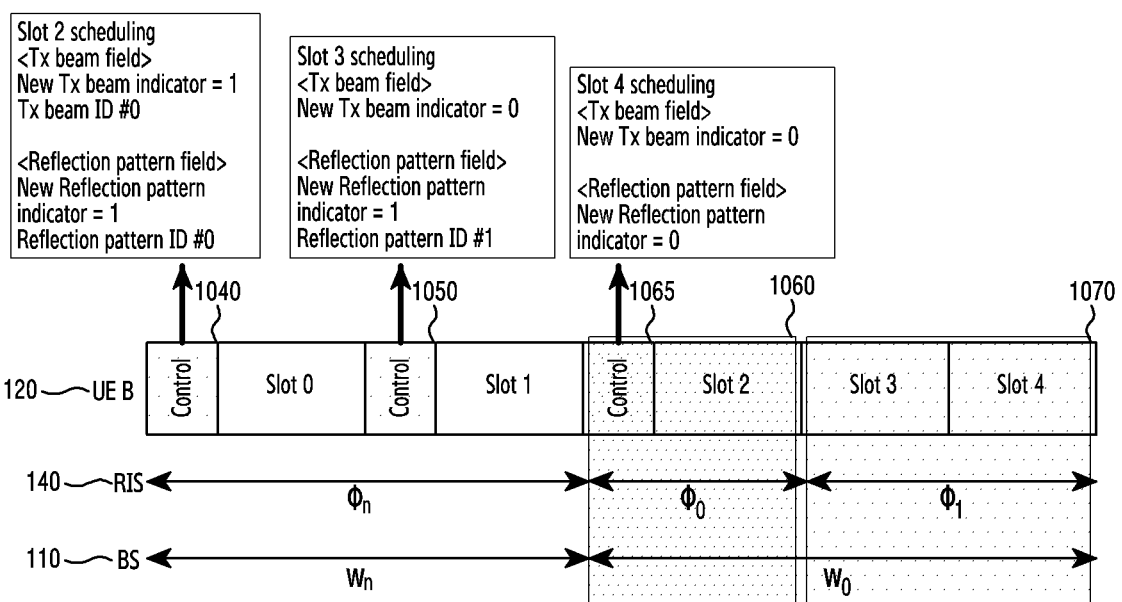

Slot 2 scheduling
<Tx beam field>
New Tx beam indicator = 1
Tx beam ID #0

<Reflection pattern field>
New Reflection pattern
indicator = 1
Reflection pattern ID #0

Slot 3 scheduling
<Tx beam field>
New Tx beam indicator = 0

<Reflection pattern field>
New Reflection pattern
indicator = 1
Reflection pattern ID #1

Slot 4 scheduling
<Tx beam field>
New Tx beam indicator = 0

<Reflection pattern field>
New Reflection pattern
indicator = 0

FIG.10B

APPARATUS AND METHOD FOR TRANSMITTING AND RECEIVING SIGNAL ACCORDING TO CHANNEL STATE IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0104928, which was filed in the Korean Intellectual Property Office on Aug. 22, 2022, the entire disclosure of which is herein incorporated by reference.

BACKGROUND

1. Field

The disclosure relates generally to a wireless communication system, and more particularly, to a method and apparatus for transmitting and receiving signals according to channel states in a wireless communication system.

2. Description of Related Art

During the continual development of wireless communication, various technologies have been developed, such as voice calls, multimedia services, and data services. Following the commercialization of 5th generation (5G) communication systems, it is expected that the number of devices that will be connected to communication networks will exponentially grow. Examples of the connected devices may include vehicles, robots, drones, home appliances, displays, smart sensors connected to various infrastructures, construction machines, and factory equipment.

Additionally, mobile devices are expected to evolve in various form-factors, such as augmented reality glasses, virtual reality headsets, and hologram devices.

In order to provide various services by connecting hundreds of billions of devices in a $6^{th}$ generation (6G) era, there are ongoing efforts to develop improved 6G communication systems. 6G communication systems may also be referred to as beyond-5G systems.

6G communication systems, which are expected to be commercialized around 2030, will have a peak data rate of tera (1,000 giga)-level bits per second (bps) and a radio latency less than 100 μsec, and thus, will be 50 times as fast as 5G communication systems and have the ¹/₁₀ radio latency thereof.

In order to accomplish such a high data rate and an ultra-low latency, it has been considered to implement 6G communication systems in a terahertz (THz) band (e.g., 95 gigahertz (GHz) to 3 THz bands). It is expected that, due to severer path loss and atmospheric absorption in the THz bands than in mmWave bands introduced in 5G, technologies capable of securing signal transmission distance (i.e., coverage) will become more crucial. As technologies should be developed for securing the coverage, such as radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there are discussions related to new technologies for improving the coverage of THz-band signals, such as metamaterialbased lenses and antennas, orbital angular momentum (OAM), and reconfigurable intelligent surface (RIS).

In order to improve the spectral efficiency and the overall network performances, the following technologies have been developed for 6G communication systems: a full-duplex technology for an uplink transmission and a downlink transmission to simultaneously use the same frequency resource at the same time; a network technology for utilizing satellites, high-altitude platform stations (HAPS), etc., in an integrated manner; an improved network structure for supporting mobile base stations (BSs) and the like and allowing for network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming a limit of a user equipment (UE) computing ability through reachable super-high-performance communication and computing resources (such as mobile edge computing (MEC), clouds, etc.) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, an optimal beam for performing communication may be determined based on a channel state between a terminal and a BS, and signals may be transmitted and received through the optimal beam. A method for determining an optimal beam and transmitting/receiving a signal in consideration of a fluctuating channel state is being considered.

SUMMARY

An aspect of the disclosure is to provide an apparatus and a method capable of effectively providing services in a mobile communication system.

According to an embodiment of the disclosure, a method performed by a UE in a wireless communication system includes receiving mapping information between a combination of a reflection pattern and a transmission beam of a BS and a reference signal (RS) from the BS; receiving scheduling information including information on a channel state corresponding to the combination of the reflection pattern and the transmission beam of the BS; identifying a reception beam based on at least one RS received from the BS, the mapping information, and the scheduling information; and receiving a downlink signal from the BS through the reception beam. The reflection pattern is related to an RIS.

According to an embodiment of the disclosure, a method performed by a BS includes transmitting mapping information between a combination of a reflection pattern and a transmission beam of a BS and an RS to a UE; transmitting scheduling information including information on a channel state corresponding to the combination of the reflection pattern and the transmission beam of the BS; transmitting the RS to the UE; and transmitting a downlink signal to the UE. The downlink signal is related to a reception beam of the UE identified based on the mapping information and the scheduling information, and the reflection pattern is related to an RIS.

According to an embodiment of the disclosure, a UE in a wireless communication system includes a transceiver; and a processor connected to the transceiver, and the processor may be configured to receive mapping information between a combination of a reflection pattern and a transmission beam of a BS and an RS from the BS; receive scheduling information including information on a channel state corresponding to the combination of the reflection pattern and the transmission beam of the BS; identify a reception beam based on at least one RS received from the BS, the mapping information, and the scheduling information; and receive a downlink signal from the BS through the reception beam. The reflection pattern is related to an RIS.

According to an embodiment of the disclosure, a BS in a wireless communication system includes a transceiver; and a processor connected to the transceiver, and the processor may be configured to transmit mapping information between a combination of a reflection pattern and a transmission beam of a BS and an RS to a UE; transmit scheduling information including information on a channel state corresponding to the combination of the reflection pattern and the transmission beam of the BS; transmit the RS to the UE; and transmit a downlink signal to the UE. The downlink signal is related to a reception beam of the UE identified based on the mapping information and the scheduling information, and the reflection pattern is related to an RIS.

BRIEF DESCRIPTION OF THE DRAWINGS

The above and other objects, features, and advantages of the disclosure will become more apparent from the following detailed description when taken in conjunction with the accompanying drawings, in which:

FIG. 10B illustrates a reception state of a terminal that is changed based on information related to a reflection pattern and a transmission state according to an embodiment.

DETAILED DESCRIPTION

Hereinafter, various embodiments of the disclosure will be described based on an approach of hardware. However, the disclosure includes a technology that uses both hardware and software, and thus the various embodiments of the disclosure may not exclude the perspective of software.

The terms used in the disclosure are only used to describe specific embodiments, and are not intended to limit the disclosure.

A singular expression may include a plural expression unless they are definitely different in a context.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In the following description, terms referring to device elements (e.g., a control unit, a processor, and a reflection element (RE)), terms referring to devices (e.g., an RIS), terms referring to data (e.g., signal, feedback, report, reporting, information, parameter, value, bit, and codeword), terms referring to concepts of wireless communication (e.g., channel, artificial channel, reflection pattern, and beam), etc., are illustratively used for the sake of descriptive convenience. Therefore, the disclosure is not limited by the terms as used below, and other terms referring to subjects having equivalent technical meanings may be used.

In the disclosure, although embodiments will be described using terms employed in some communication standards (e.g., the 3rd generation partnership project (3GPP)), they are only for the sake of illustration. The embodiments of the disclosure may also be applied to other communication systems through modifications.

Figure 1:
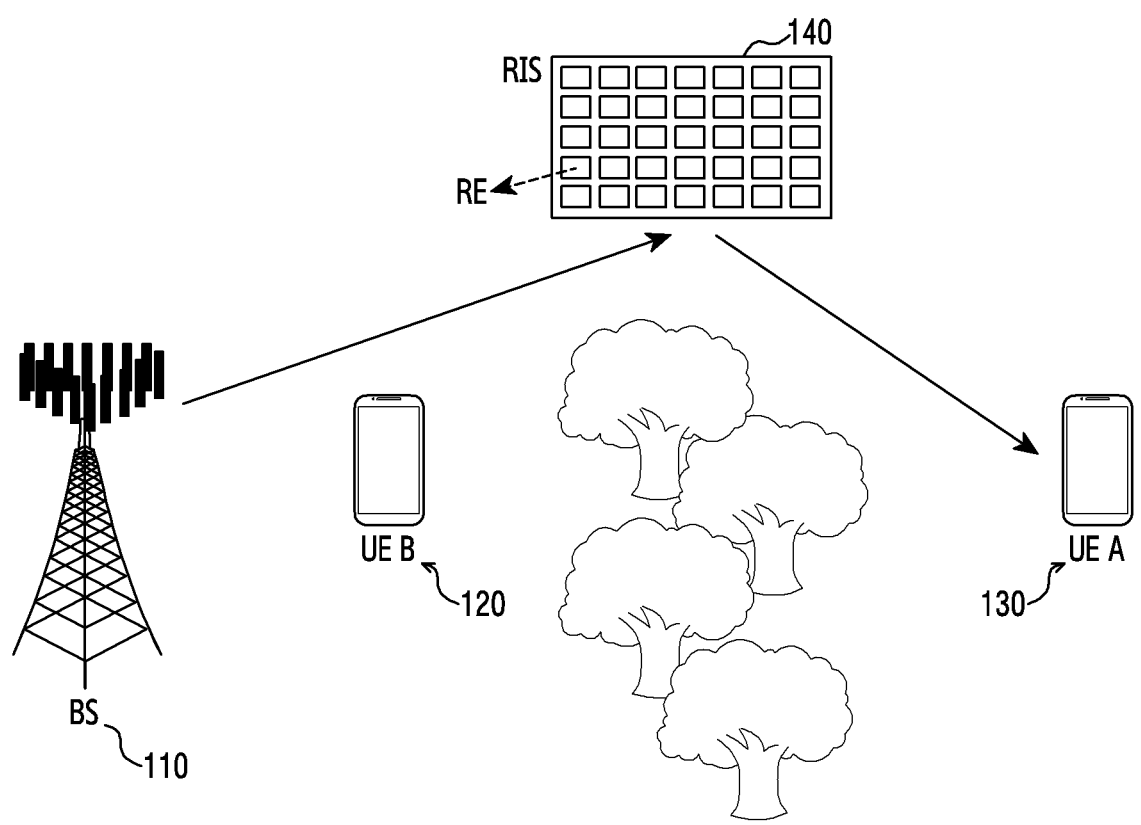
FIG. 1 illustrates a wireless communication environment according to an embodiment.

FIG. 1 illustrates a wireless communication system according to an embodiment.

Referring to FIG. 1, the wireless communication system includes a BS 110, a terminal 120, a terminal 130, and an RIS 140. Although FIG. 1 illustrates only one BS, other BSs identical or similar to the BS 110 may be further included. Although FIG. 1 illustrates only one RIS, other RISs identical or similar to the RIS 140 may also be included.

The BS 110 is a network infrastructure that provides radio access to the terminals 120 and 130. The BS 110 has coverage defined as a predetermined geographic area based on a distance at which a signal may be transmitted. The BS 110 may also be referred to as an access point (AP), an eNodeB (eNB), a 5G node, a 6G node, a wireless point, a transmission/reception point (TRP), or other term having an equivalent technical meaning.

Each of the terminal 120 and the terminal 130 is a device that may be used by a user and communicates with the BS 110 through a radio channel. In some cases, at least one of the terminals 120 and 130 may be operated without user involvement. That is, at least one of the terminals 120 and 130 may be a device that performs machine type communication (MTC) and may not be carried by a user. The terminals 120 and 130 may also be referred to as UEs, mobile stations, subscriber stations, customer premises equipment (CPE), remote terminals, wireless terminals, electronic devices, user devices, or other terms having equivalent technical meanings.

The BS 110, the terminal 120, and the terminal 130 may transmit and receive radio signals in a mmWave band (e.g., 28 GHz, 30 GHz, 38 GHz, 60 GHz, over 60 GHz, etc.). In order to improve channel gain, the BS 110, the terminal 120, and the terminal 130 may perform beamforming. The beamforming may include transmission beamforming and reception beamforming That is, the BS 110, the terminal 120, and the terminal 130 may provide directivity to a transmission signal or a reception signal. To this end, the BS 110, the terminal 120, and the terminal 130 may select serving beams 112, 113, 121, and 131 through a beam search or beam management procedure. After the serving beams 112, 113, 121, and 131 are selected, communication may be performed through a resource having a quasi co-located (QCL) relationship with a resource transmitting the serving beams 112, 113, 121, and 131.

For example, when it is difficult for the terminal 130 to directly transmit and receive radio signals to and from the BS 110 due to obstacles (e.g., trees, buildings, etc.), the terminal 130 may receive the signals indirectly reflected from the BS 110 through the RIS 140. That is, the terminal 130 may receive a reflection signal reflected by the RIS 140. The RIS 140 may include a plurality of REs. The RIS 140 may be connected to the BS 110, e.g., through a wired connection or wirelessly.

Each RE of the RIS 140 may adjust a phase and an amplitude of a signal to be reflected. For example, the RIS 140 may adjust the phase and amplitude of a signal received from the BS 110 by a specific value based on each RE. In this case, a combination of the phase and the amplitude of the signal to be adjusted by the specific value may be referred to as a reflection pattern. That is, the RIS 140 may adjust the phase and the amplitude of the signal received from the BS 110 based on the reflection pattern.

The RIS 140 may be operated based on a plurality of reflection patterns. For example, a first reflection pattern among the plurality of reflection patterns may be applied to a plurality of REs included in the RIS 140. The RIS 140 to which the first reflection pattern is applied may reflect the signal received from the BS 110 as a signal having a first reflection characteristic. Here, reflecting with a signal having reflection characteristics may refer to changing the characteristic of the received signal and reflecting the signal as it is, or generating a new signal based on the characteristic of the received signal and a reflection pattern (reflection phase and reflection amplitude) to be adjusted and transmitting the signal.

In addition, when a second reflection pattern different from the first reflection pattern among the plurality of reflection patterns is applied to the RIS 140, the second reflection pattern may be applied to a plurality of REs included in the RIS 140. In this case, the RIS 140 may reflect a signal having a different characteristic from a signal reflected by the first reflection pattern. That is, by the RIS 140 to which the second reflection pattern is applied, a signal having a second reflection characteristic may be reflected. A plurality of reflection patterns may be included in an RIS beambook.

The RIS 140 may also determine a specific reflection pattern and a time period during which the specific reflection pattern is maintained (hereinafter referred to as a reflection pattern period) in order to reflect the signal received from the BS 110 and transmit the reflected signal to the terminal 120. The reflection pattern and the reflection pattern period of the RIS 140 may be configured by the BS 110. For example, the RIS 140 may receive configuration information from the BS 110 and determine the reflection pattern and the reflection pattern period based on the configuration information.

In addition, the RIS 140 may determine the reflection pattern and the reflection pattern period based on information on a wire (wired connection) connected from the BS 110. Here, determining the reflection pattern may include selecting one of the reflection patterns of an RIS beambook and using the selected reflection pattern to reflect a received signal.

As described above, the terminal 130 may not directly receive a signal from the BS 110 due to an obstacle, but may maintain communication by receiving a signal reflected by the RIS 140. However, because the RIS 140 has a broadband reflection characteristic, a channel for the terminal 120, other than the terminal 130 communicating using the RIS 140 may also be affected. In the example of FIG. 1, the terminal 120 is capable of directly transmitting and receiving a signal to and from the BS 110, but may be affected by a signal reflected by the RIS 140. That is, the signal reflected by the RIS 140 may act as interference to the terminal 120.

In a wireless communication system that includes the RIS 140, a channel characteristic of a terminal that does not require the RIS 140 (e.g., the terminal 120) may be changed by an unwanted reflection signal. Hereinafter, for convenience of description, a channel whose characteristics are changed by an unwanted reflected signal is referred to as an artificial channel.

As described above, a method is provided for more effective communication by determining an optimal reception beam (or Rx beam) of the terminal in consideration of the influence on the channel of the terminal caused by an operating RIS, and transmitting and receiving signals accordingly.

Figure 2:
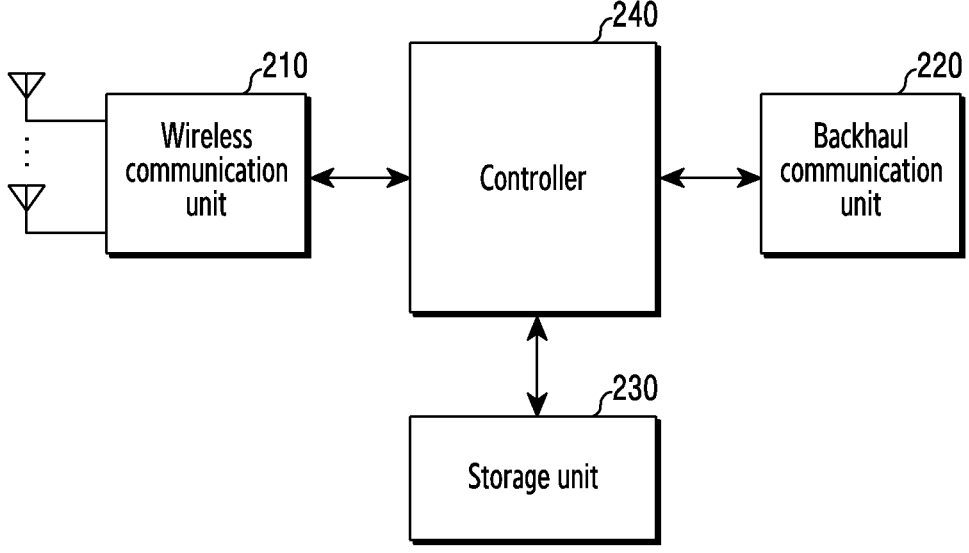
FIG. 2 illustrates a BS in a wireless communication system according to an embodiment.

FIG. 2 illustrates a BS in a wireless communication system according to an embodiment. For example, the BS 110 of FIG. 1 may be configured like the BS illustrated in FIG. 2. Additionally, terms such as " . . . unit," etc., used below, refer to a unit that processes at least one function or operation, which may be implemented by hardware or software, or a combination of hardware and software.

Referring to FIG. 2, the BS includes a wireless communication unit 210, a backhaul communication unit 220, a storage unit 230, and a controller 240.

The wireless communication unit 210 performs functions for transmitting and receiving signals through a radio channel. For example, the wireless communication unit 210 performs a conversion function between a baseband signal and a bit string according to the physical layer standard of the system. When transmitting data, the wireless communication unit 210 may generate complex symbols by encoding and modulating a transmission bit string. In addition, when receiving data, the wireless communication unit 210 may restore the received bit string through demodulation and decoding of the baseband signal. In addition, the wireless communication unit 210 may up-convert the baseband signal into an RF band signal, transmit the signal through an antenna, and down-convert the RF band signal received through the antenna into a baseband signal.

To this end, the wireless communication unit 210 may include a transmission filter, a reception filter, an amplifier, a mixer, an oscillator, a digital to analog converter (DAC), an analog to digital converter (ADC), etc. In addition, the wireless communication unit 210 may include a plurality of transmission and reception paths. The wireless communication unit 210 may include at least one antenna array including a plurality of antenna elements. In terms of hardware, the wireless communication unit 210 may include a digital unit and an analog unit, and the analog unit may include a plurality of sub-units according to operating power, operating frequency, etc.

The wireless communication unit 210 may transmit and receive signals. To this end, the wireless communication unit 210 may include at least one transceiver. The wireless communication unit 210 may transmit a synchronization signal (SS), an RS, system information (SI), a message, control information, data, etc. In addition, the wireless communication unit 210 may perform beamforming.

The wireless communication unit 210 may transmit and receive signals as described above. Accordingly, all or part of the wireless communication unit 210 may be referred to as a transmitter, a receiver, or a transceiver. In addition, in the following description, transmission and reception performed through a radio channel are used to refer to that the above-described processing is performed by the wireless communication unit 210.

The backhaul communication unit 220 provides an interface for communicating with other nodes in a network. That is, the backhaul communication unit 220 may convert a bit string transmitted from the BS 110 to another node, e.g., another access node, another BS, an upper node, a core network, etc., into a physical signal, and may convert the physical signal received from the other node into a bit string.

The storage unit 230 stores data such as a basic program, an application program, and configuration information for operation of the BS 110. The storage unit 230 may include a memory. The storage unit 230 may include a volatile memory, a non-volatile memory, or a combination of volatile and non-volatile memories. In addition, the storage unit 230 may provide the stored data according to the request of the controller 240.

The storage unit 230 may store learning data for AI-based channel state information (CSI) feedback and apply the stored learning data to a neural network structure of AI-based CSI feedback.

The controller 240 controls overall operations of the BS 110. For example, the controller 240 may transmit and receive signals through the wireless communication unit 210 or the backhaul communication unit 220. In addition, the controller 240 may write and read data in the storage unit 230. In addition, the controller 240 may perform functions of a protocol stack required by communication standards. To this end, the controller 240 may include at least one processor.

The configuration of the BS illustrated in FIG. 2 is only one example, and a BS for performing various embodiments of the disclosure is not limited from the configuration illustrated in FIG. 2. That is, according to various embodiments, some components of the BS may be added, deleted, or changed.

Although the BS is described as one entity in FIG. 2, the disclosure is not limited thereto. The BS may be implemented to configure an access network having a distributed deployment as well as an integrated deployment. The BS may be divided into a central unit (CU) and a distributed unit (DU), and the CU may be implemented to perform an upper layer function (e.g., packet data convergence protocol (PDCP) and radio resource control (RRC)) and the DU may be implemented to perform a lower layer function (e.g., medium access control (MAC) and physical (PHY)). The DU of the BS may form beam coverage on a radio channel.

Figure 3:
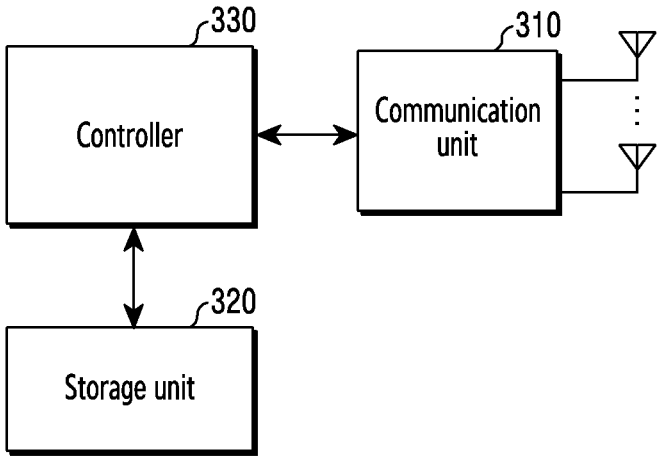
FIG. 3 illustrates a terminal in a wireless communication system according to an embodiment.

FIG. 3 illustrates a terminal in a wireless communication system according to an embodiment. For example, the terminals 120 and/or 130 of FIG. 1 may be configured like the terminal illustrated in FIG. 3.

Referring to FIG. 3, the terminal includes a communication unit 310, a storage unit 320, and a controller 330.

The communication unit 310 performs functions for transmitting and receiving signals through a radio channel. For example, the communication unit 310 may perform a conversion function between a baseband signal and a bit string according to the physical layer standard of the system. When transmitting data, the communication unit 310 may generate complex symbols by encoding and modulating a transmission bit string. In addition, when receiving data, the communication unit 310 may restore the received bit string through demodulation and decoding of the baseband signal. In addition, the communication unit 310 may up-convert the baseband signal into an RF band signal, transmit the signal through an antenna, and down-convert the RF band signal received through the antenna into a baseband signal. For example, the communication unit 310 may include a transmission filter, a reception filter, an amplifier, a mixer, an oscillator, a DAC, an ADC, etc.

In addition, the communication unit 310 may include a plurality of transmission and reception paths. Furthermore, the communication unit 310 may include an antenna unit. The communication unit 310 may include at least one antenna array including a plurality of antenna elements. In terms of hardware, the communication unit 310 may include a digital circuit and an analog circuit (e.g., an RF integrated circuit (RFIC)). Here, the digital circuit and the analog circuit may be implemented in one package. In addition, the communication unit 310 may include multiple RF chains. The communication unit 310 may perform beamforming. The communication unit 310 may apply a beamforming weight to the signal in order to give a directionality according to the configuration of the controller 330 to the signal to be transmitted and received.

The communication unit 310 may include an RF block (or RF unit). The RF block may include a first RF circuitry related to an antenna and a second RF circuitry related to baseband processing. The first RF circuit may be referred to as RF-A (antenna). The second RF circuit may be referred to as RF-B (baseband).

In addition, the communication unit 310 may transmit and receive signals. To this end, the communication unit 310 may include at least one transceiver. The communication unit 310 may receive a downlink signal. The downlink signal may include an SS, an RS (e.g., cell-specific RS (CRS) and demodulation RS (DMRS)), SI (e.g., a master information block (MIB), an SI block (SIB), remaining SI (RMSI), and other SI (OSI)), a configuration message, control information, downlink data, etc. In addition, the communication unit 310 may transmit an uplink signal. The uplink signal may include a random access related signal (e.g., a random access preamble (RAP) (or message 1 (Msg 1)) and message 3 (Msg3)), an RS (e.g., a sounding RS (SRS) and DMRS), a power headroom report (PHR), etc.

In addition, the communication unit 310 may include different communication modules to process signals of different frequency bands. Furthermore, the communication unit 310 may include a plurality of communication modules to support a plurality of different radio access technologies. The different radio access technologies may include Bluetooth low energy (BLE), wireless fidelity (Wi-Fi), Wi-Fi gigabyte (WiGig), cellular networks (e.g., long-term evolution (LTE) and new radio (NR)), etc.

The different frequency bands may include a super high frequency (SHF) (e.g., 2.5 GHz and 5 GHz) band and a millimeter wave (e.g., 38 GHz, 60 GHz, etc.) band. In addition, the communication unit 310 may use the same radio access technology on different frequency bands (e.g., unlicensed band for licensed assisted access (LAA) and citizens broadband radio service (CBRS) (e.g., 3.5 GHz)).

The communication unit 310 may transmit and receive signals as described above. Accordingly, all or part of the communication unit 310 may be referred to as a transmitter, a receiver, or a transceiver. In addition, in the following description, transmission and reception performed through a radio channel are used to refer to that the above-described processing is performed by the communication unit 310.

The storage unit 320 stores data such as a basic program, an application program, and configuration information for operation of the terminal. The storage unit 320 may include a volatile memory, a non-volatile memory, or a combination of volatile and non-volatile memories. In addition, the storage unit 320 may provide the stored data according to the request of the controller 330. The storage unit 320 may store learning data for AI-based CSI feedback according to a feedback format configured by the BS.

The controller 330 controls overall operations of the terminal. For example, the controller 330 may transmit and receive signals through the communication unit 310. In addition, the controller 330 may write and read data in the storage unit 320. In addition, the controller 330 may perform functions of a protocol stack required by communication standards. To this end, the controller 330 may include at least one processor, or may be a part of a processor. In addition, a part of the communication unit 310 and the controller 330 may be referred to as a communication processor (CP). The controller 330 may include various modules for performing communication. The controller 330 may control the terminal to perform operations according to various embodiments.

The configuration of the terminals in FIG. 3 is only one example of a terminal, and a terminal performing various embodiments of the disclosure is not limited to the configuration illustrated in FIG. 3. That is, according to various embodiments, some elements of the terminal may be added, deleted, or changed.

Figure 4:
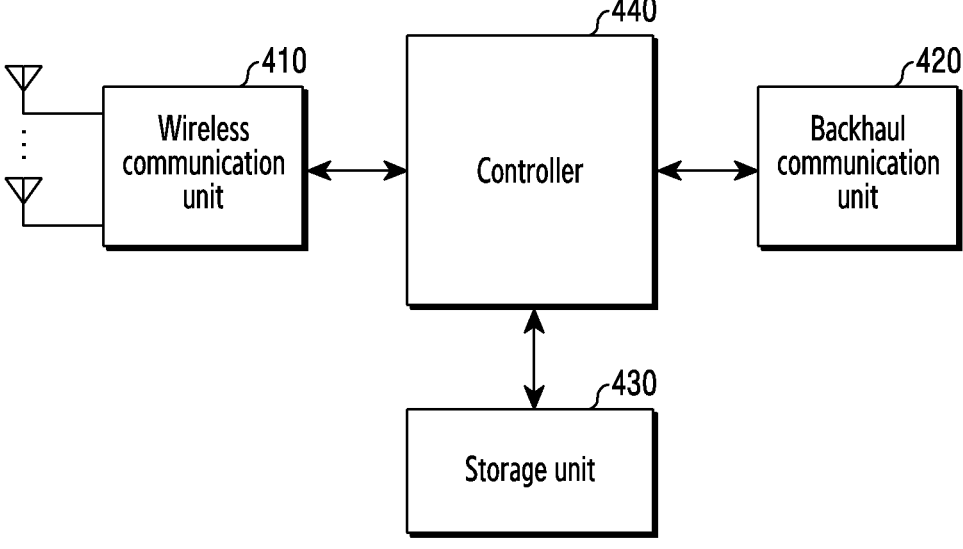
FIG. 4 illustrates an RIS in a wireless communication system according to an embodiment.

FIG. 4 illustrates an RIS device in a wireless communication system according to an embodiment. For example, the RIS 140 of FIG. 1 may be configured like the RIS illustrated in FIG. 4.

Referring to FIG. 4, the RIS includes a wireless communication unit 410, a backhaul communication unit 420, a storage unit 430, and a controller 440.

The wireless communication unit 410 performs functions for transmitting and receiving signals through a radio channel. For example, the wireless communication unit 410 may perform a conversion function between a baseband signal and a bit string according to the physical layer standard of the system. When transmitting data, the wireless communication unit 410 may generate complex symbols by encoding and modulating a transmission bit string. In addition, when receiving data, the wireless communication unit 410 may restore the received bit string through demodulation and decoding of the baseband signal. In addition, the wireless communication unit 410 may up-convert the baseband signal into an RF band signal, transmit the signal through an antenna, and down-convert the RF band signal received through the antenna into a baseband signal. The wireless communication unit 410 of the RIS may receive a signal from the BS, reflect the received signal, and transmit the reflected signal to a terminal. In addition, the wireless communication unit 410 of the RIS may receive a signal from the terminal, reflect the received signal, and transmit the reflected signal to the BS. The RIS may reflect the received signal as it is or transmit a signal generated based on information on the received signal through the wireless communication unit 410.

To this end, the wireless communication unit 410 may include a transmission filter, a reception filter, an amplifier, a mixer, an oscillator, a DAC, an ADC, etc. In addition, the wireless communication unit 410 may include a plurality of transmission and reception paths. Furthermore, the wireless communication unit 410 may include at least one antenna array including a plurality of antenna elements. In terms of hardware, the wireless communication unit 410 may include a digital unit and an analog unit, and the analog unit may include a plurality of sub-units according to operating power, operating frequency, etc.

In addition, the wireless communication unit 410 may include a plurality of REs. Based on the plurality of REs, the wireless communication unit 410 may reflect a received signal. In the case of reflection, the amplitude and phase of the received signal may be adjusted by a specific value. A combination of the amplitude and phase of a signal to be adjusted by the specific value may be referred to as a reflection pattern.

The wireless communication unit 410 may transmit and receive signals. To this end, the wireless communication unit 410 may include at least one transceiver. For example, the wireless communication unit 410 may transmit an SS, an RS, SI, a message, control information, data, etc. In addition, the wireless communication unit 410 may perform beamforming.

The wireless communication unit 410 may transmit and receive signals as described above. Accordingly, all or part of the wireless communication unit 410 may be referred to as a transmitter, a receiver, or a transceiver. In addition, in the following description, transmission and reception performed through a radio channel are used to refer to that the above-described processing is performed by the wireless communication unit 410.

The backhaul communication unit 420 provides an interface for communicating with other nodes in a network. That is, the backhaul communication unit 420 may convert a bit string transmitted from the RIS to another node, e.g., another access node, another BS, an upper node, a core network, etc., into a physical signal, and may convert the physical signal received from the other node into a bit string. The RIS may receive configuration information on a reflection pattern and a reflection pattern period from the BS through the backhaul communication unit 420.

The storage unit 430 stores data such as a basic program, an application program, and configuration information for operation of the RIS. The storage unit 430 may include a memory. The storage unit 430 may include a volatile memory, a non-volatile memory, or a combination of volatile and non-volatile memories. In addition, the storage unit 430 may provide the stored data according to the request of the controller 440. The storage unit 430 may previously store information on a plurality of reflection patterns applied to the RIS (i.e., an RIS beambook).

The controller 440 controls overall operations of the RIS. For example, the controller 440 may transmit and receive signals through the wireless communication unit 410 or the backhaul communication unit 420. In addition, the controller 440 may write and read data in the storage unit 430. In addition, the controller 440 may perform functions of a protocol stack required by communication standards. To this end, the controller 440 may include at least one processor.

The configuration of the RIS illustrated in FIG. 4 is only one example of an RIS device, and a RIS device performing various embodiments of the disclosure is not limited from the configuration illustrated in FIG. 4. That is, according to various embodiments, some elements of RIS may be added, deleted, or changed.

Figure 5A:
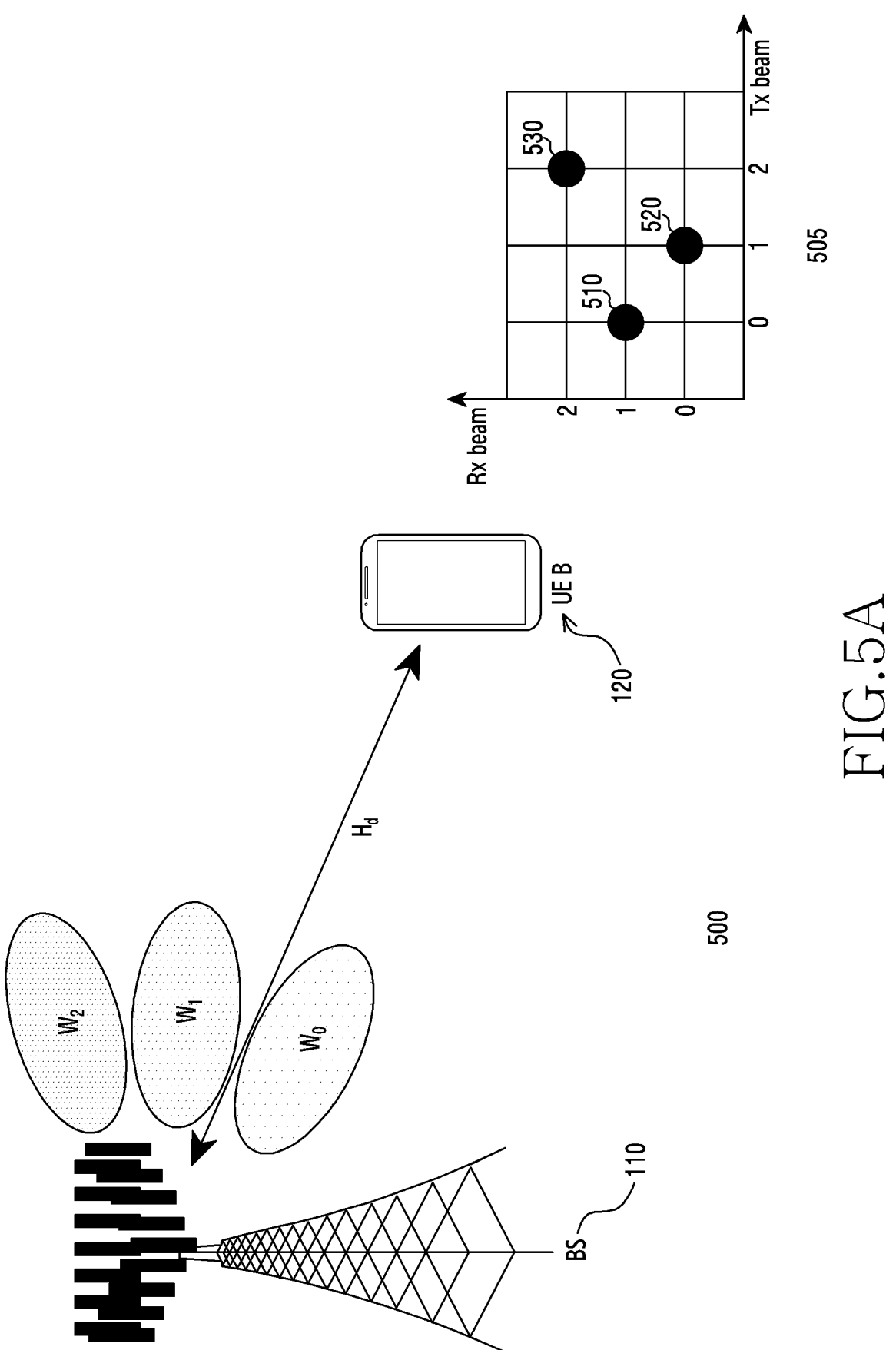
FIG. 5A illustrates a method of determining a beam according to a channel state between a BS and a terminal according to an embodiment.

FIG. 5A illustrates a method of determining a beam according to a channel state between a BS and a terminal according to an embodiment. For example, the method of FIG. 5A will be described with reference to the wireless communication environment illustrated in FIG. 1.

Referring to FIG. 5A, in situation 500, the BS 110 may operate a plurality of beams, e.g., three beams $W_0$, $W_1$, and $W_2$. Here, the three beams may refer to transmission beams of the BS 110. However, the transmission beam of the BS 110 may also be used as a reception beam due to channel reciprocity. Hereinafter, for convenience of description, it is referred to as a transmission beam or a beam of the BS 110, but it does not refer to only the transmission beam of the BS 110, but may refer to a transmission beam, or a transmission beam and a reception beam.

In situation 500, the BS 110 may communicate with the terminal 120 based on a plurality of beams. The BS 110 may communicate with the terminal 120 by transmitting and receiving signals through a specific beam among the plurality of beams. In this case, the terminal 120 may receive RS s transmitted through the plurality of beams of the BS 110 and measure the strength of the received RSs. The terminal 120 may determine an optimal Rx beam based on the measured strength of the RS. In this case, the channel state may be changed based on the transmission beam of the BS 110, and the optimal reception beam of the terminal 120 may be determined based on the channel state.

Referring to graph 505, the x-axis refers to an index of the transmission beam, and the y-axis refers to an index of the reception beam. When the transmission beam of the BS 110 is $W_0$ (510), the optimal reception beam of the terminal 120 may be $f_1$, i.e., a frequency corresponding to the reception beam index 2. In addition, when the transmission beam of the BS 110 is $W_1$ (520), the optimal reception beam of the terminal 120 may be $f_0$. In addition, when the transmission beam of the BS 110 is $W_2$ (530), the optimal reception beam of the terminal 120 may be $f_2$. As described above, the optimal reception beam of the terminal 120 may be determined based on the transmission beam of the BS 110. However, the graph 505 is merely an example, and the disclosure is not limited thereto. For example, the optimal reception beam of different transmission beams (e.g., $W_0$ and $W_1$) of the BS 110 may be the same beam (e.g., $f_1$).

Figure 5B:
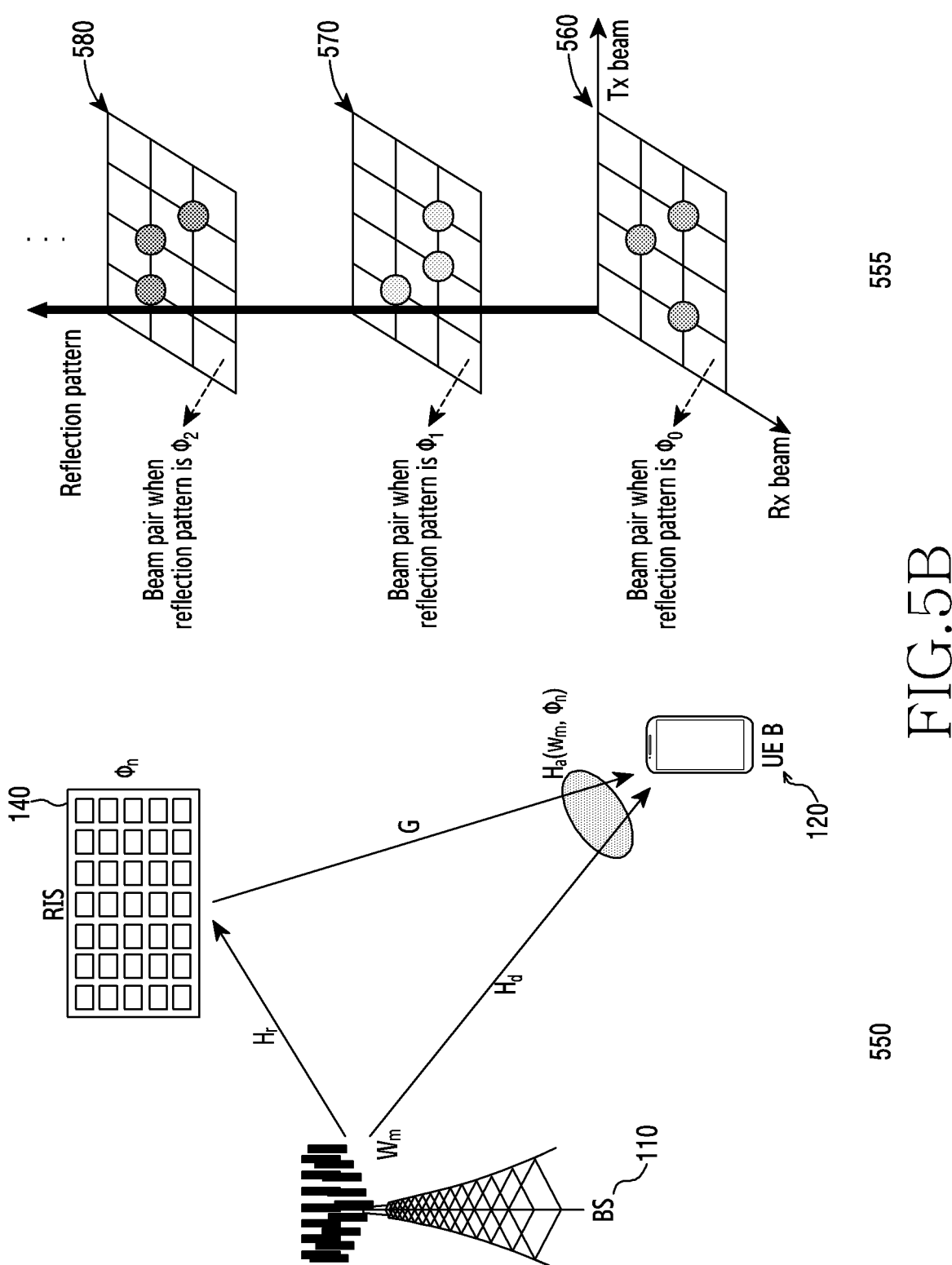
FIG. 5B illustrates a method of determining a beam according to a channel state between a BS and a terminal according to an embodiment.

FIG. 5B illustrates a method of determining a beam according to a channel state between a BS and a terminal according to an embodiment. For example, the method of FIG. 5B will be described with reference to the wireless communication environment illustrated in FIG. 1.

Referring to FIG. 5B, in situation 550, the BS 110 may operate a plurality of beams, e.g., three beams $W_0$, $W_1$, and $W_2$. Unlike in situation 500 of FIG. 5A, in situation 550, the RIS 140 is also included. That is, the BS 110 may communicate with other terminals (not illustrated) through the RIS 140.

In situation 550, the BS 110 may communicate with the terminal 120 based on a plurality of beams. The BS 110 may communicate with the terminal 120 by transmitting and receiving signals through a specific beam among the plurality of beams. In this case, the terminal 120 may receive RSs transmitted through the plurality of beams of the BS 110 and measure the strength of the received RSs. However, unlike in situation 500, in situation 550, the channel between BS 110 and terminal 120 may be affected by the RIS 140. Specifically, the channel of the terminal 120 may be influenced (G) by reflecting the signal (channel by signal ($H_r$)) transmitted from the BS 110 by the RIS 140. Accordingly, the channels of the BS 110 and the terminal 120 may be affected by the artificial channel Ha ($W_m$, $\Phi_n$) formed by the RIS 140. The terminal 120 may determine an optimal reception beam based on the artificial channel condition. In this case, the state of the artificial channel may be changed based on a combination of a transmission beam of the BS 110 and a reflection pattern of the RIS 140, and an optimal reception beam of the terminal 120 may be determined. That is, unlike in situation 500 of FIG. 5A, in situation 550 of FIG. 5B, an optimal reception beam of the terminal 120 may be determined based on a combination of the reflection pattern of the RIS 140 in addition to the transmission beam of the BS 110.

Referring to the graph 555, the x-axis refers to an index of the transmission beam, the y-axis refers to an index of the reception beam, and the z-axis refers to an index of the reflection pattern. When the reflection pattern is $\Phi_0$ (560), the optimal reception beam of the terminal 120 may vary according to the transmission beam of the BS 110. When the reflection pattern is $\Phi_1$ (570), the optimal reception beam of the terminal 120 may vary according to the transmission beam of the BS 110. When the reflection pattern is $\Phi_2$ (580), the optimal reception beam of the terminal 120 may vary according to the transmission beam of the BS 110.

For example, comparing the case where the reflection pattern is (Di (570) and the case where the reflection pattern is (Do (560), even if the transmission beam of the BS 110 is the same, the optimal reception beam of the terminal 120 may be different according to the reflection pattern. That is, the optimal reception beam of the terminal 120 may be determined based on the reflection pattern (e.g., reflection phase and reflection amplitude) of the RIS 140 as well as the transmission beam of the BS 110. This is because the existing channel is influenced by the signal reflected through the RIS 140 to form an artificial channel, which may have different channel characteristics from the existing channel between the terminal 120 and the BS 110. Accordingly, information on the reflection pattern of the RIS 140 together with the transmission beam of the BS 110 may be required to determine an optimal reception beam for the terminal 120 to communicate with the BS 110.

Hereinafter, in the disclosure, a method (Hereinafter, referred to as a beam determination method based on a reflection pattern) for determining the optimal reception beam of the terminal based on the reflection pattern (reflection phase and reflection amplitude) of the RIS for smooth communication of the terminal having difficulty in communication with the BS due to obstacles as well as the transmission beam of the BS will be described.

Figure 6:
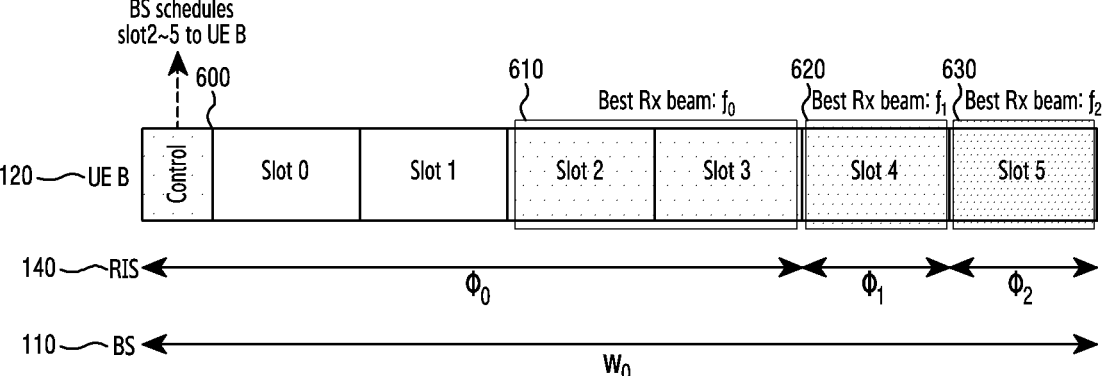
FIG. 6 illustrates a reception state of a terminal that is changed according to a transmission state and a channel state according to an embodiment.

FIG. 6 illustrates a reception state of a terminal that is changed according to a transmission state and a channel state according to an embodiment. For example, FIG. 6 will be described with reference to the wireless communication environment illustrated in FIG. 1.

In FIG. 6, the transmission state may refer to a transmission state for downlink transmitted from the BS 110 to the terminal 120. For example, the transmission state may refer to an index of the transmission beam of the BS 110, the power level of the transmission beam, and the change period of the transmission beam. Here, the channel state may refer to a channel state (e.g., channel characteristics) for communication between the BS 110 and the terminal 120. The state of the channel may refer to a state of a channel (e.g., an artificial channel) changed by the RIS 140. The reception state may refer to a reception state for downlink received by the terminal 120 from the BS 110. For example, the reception state may refer to an index of the reception beam of the terminal 120, the power level of the reception beam, and the change period of the reception beam.

More specifically, FIG. 6 illustrates a situation in which an optimal reception beam of the terminal 120 is changed according to a transmission beam of the BS 110 and a reflection pattern of the RIS 140.

Referring to FIG. 6, the index of the transmission beam of the BS 110 may be $W_0$-in the time interval of the control signal period 600 to slot 5 630. The index of the reflection pattern of the RIS 140 in the time interval of the control signal period 600 to slot 2 and slot 3 610 may be $\Phi$-0, the index of the reflection pattern of the RIS 140 in the time interval of slot 4 620 is $\Phi$-1, and the index of the reflection pattern of the RIS 140 in the time interval of slot 5 630 is $\Phi$-2.

In FIG. 6, a unit of time interval is illustrated as a slot for convenience of description, but the disclosure is not limited thereto. For example, the unit of time interval may be defined as a symbol (e.g., an OFDM symbol), a slot, a subframe, a half-frame, or a frame or radio frame. In addition, the length of the time interval may vary according to subcarrier spacing (SCS).

Referring to FIG. 6, in the control signal period 600, the BS 110 may schedule slot 2 and slot 3 610, slot 4 620, and slot 5 630 to the terminal 120. Here, scheduling may refer to allocating resources for transmission and reception to the terminal 120. In the period of slot 2 and slot 3 610, when the index of the transmission beam of the BS 110 is $W_0$ and the index of the reflection pattern of the RIS 140 is $\Phi$-0, the index of the optimal reception beam of the terminal may be $f_0$. In the period of slot 4 620, when the index of the transmission beam of the BS 110 is $W_0$ and the index of the reflection pattern of the RIS 140 is $\Phi$-1, the index of the optimal reception beam of the terminal may be $f_1$. In the period of slot 5 630, when the index of the transmission beam of the BS 110 is $W_0$ and the index of the reflection pattern of the RIS 140 is $\Phi$-2, the index of the optimal reception beam of the terminal may be $f_2$.

As described above, even when the transmission beam of the BS 110 is not changed, if the reflection pattern of the RIS 140 is changed, an optimal reception beam for the terminal 120 to receive a signal from the BS 110 may be changed. Accordingly, the terminal 120 should consider a dynamic change of a channel according to a change in the reflection pattern of the RIS 140 while measuring a channel based on a signal received from the BS 110 and estimating characteristics of the channel That is, the terminal 120 may determine a reception state (e.g., an optimal receive beam) of the terminal 120 for characteristics of the changed channel (artificial channel) based on the information on the reflection pattern of the RIS 140 together with the information on the transmission state of the BS 110.

Figure 7:
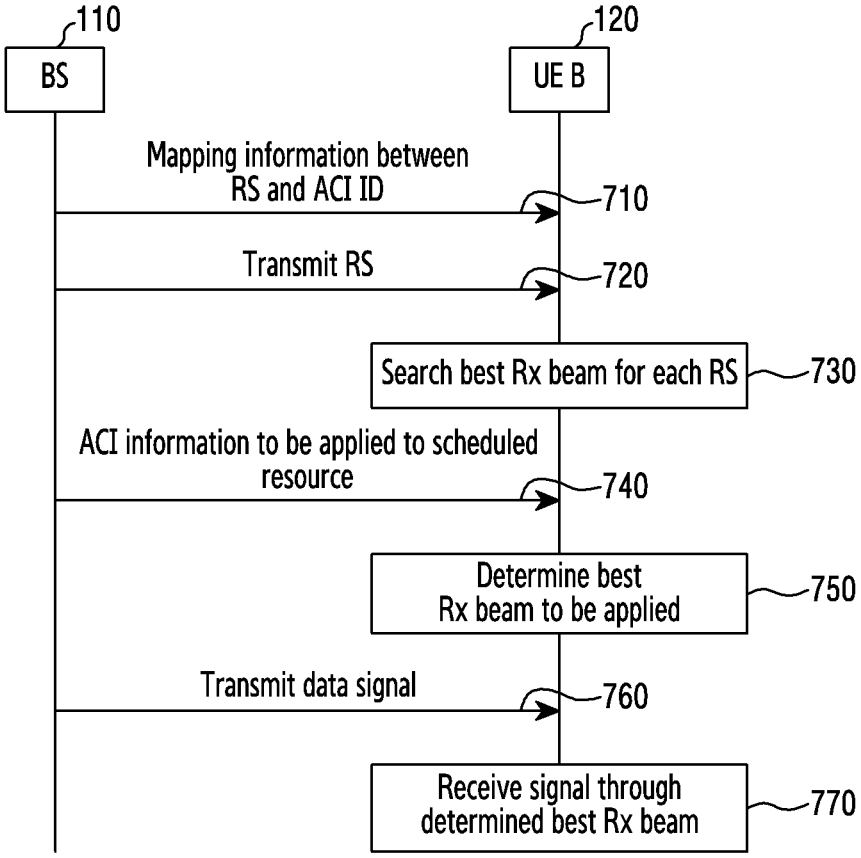
FIG. 7 is signal flow diagram illustrating a method for determining a reception state of a terminal based on information including a reflection pattern according to an embodiment.

FIG. 7 is a signal flow diagram illustrating a method for determining a reception state of a terminal based on information including a reflection pattern according to an embodiment. For example, the method of FIG. 7 will be described with reference to the wireless communication environment illustrated in FIG. 1.

In FIG. 7, the reception state may refer to a reception state for downlink received by the terminal 120 from the BS 110. For example, the reception state may refer to the index of the reception beam of the terminal 120, the power level of the reception beam, and the change period of the reception beam.

Referring to FIG. 7, a process of determining a reception beam of the terminal 120 and receiving a signal includes defining and transmitting a combination of information (e.g., information on the transmission beam) on the transmission state of the BS 110 and information on the reflection pattern of the RIS as one piece of state information. Here, one piece of state information, which is a combination of information on the transmission state of the BS 110 and information in the reflection pattern of the RIS, may be referred to as an artificial channel indicator (ACI) state identifier (ID).

In step 710, the BS 110 transmits configuration information on a mapping between an RS and an ACI state ID to the terminal 120. For example, configuration information transmitted from the BS 110 to the terminal 120 may be transmitted through higher layer signaling, e.g., RRC signaling. In addition, configuration information may be transmitted through downlink control information (DCI). In addition, configuration information may be activated by DCI after being configured through the RRC signaling.

The ACI state ID may be defined by a combination of information on the transmission state of the BS 110 and information on the reflection pattern of the RIS. For example, the information on the transmission state of the BS 110 may be an index of a transmission beam of the BS. The information on the reflection pattern of RIS may be an index for identifying one of the reflection patterns of the RIS beambook. A reflection pattern value corresponding to a reflection pattern index may include information on a reflection phase and a reflection amplitude. As the BS 110 informs the terminal 120 of mapping information of the ACI state ID applied to each of the at least one RS, the terminal 120 may determine an optimal reception beam corresponding to each RS. In other words, the terminal 120 may determine an optimal reception beam corresponding to each RS based on the mapping information.

In step 720, the BS 110 transmits an RS to the terminal 120. Here, the RS may refer to a signal for determining a reception beam of the terminal 120. For example, the RS may include a CSI-RS, an SS block (SSB), a DMRS, etc.

In step 730, the terminal 120 searches for an optimal reception beam for each RS based on configuration information for the mapping between the RS and the ACI state ID received from the BS 110. That is, the terminal 120 may identify an optimal reception beam for at least one RS received from the BS 110. An optimal reception beam for an RS corresponding to each ACI state ID may be identified based on RS received power (RSRP) and a threshold value, and an optimal reception beam may be identified according to the ACI state ID. Here, the threshold value may be preconfigured based on the channel condition.

In step 740, the BS 110 transmits ACI information to be applied to the scheduled resource to the terminal 120. For example, the BS 110 may transmit at least one ACI state ID applied for each time interval with respect to resources scheduled for the terminal 120. In addition, the BS 110 may transmit information on a time interval in which the ACI state ID is maintained. For example, information on the maintained time intervals may include the number of maintained time intervals. Here, information on the maintained time interval may be referred to as information on repeated time intervals. The information on the maintained time interval may be configured differently for each ACI state ID.

In addition, the BS 110 may transmit information on a starting time point in which the ACI state ID is applied. For example, the information on the starting time point to be applied may be indicated through an offset from the current time point. The information on the starting time point to be applied may be configured differently for each ACI state ID.

In step 750, the terminal 120 determines an optimal reception beam for each time interval based on ACI information to be applied to the scheduled resource. For example, the terminal 120 may determine the optimal Rx beam for each time interval based on a search result of the optimal Rx beam for each RS and ACI information to be applied to the scheduled resource.

In step 760, the BS 110 transmits a downlink data signal to the terminal 120.

In step 770, the terminal 120 receives the downlink data signal transmitted from the BS 110 by using the reception beam determined in step 750.

As illustrated in FIG. 7, a method is provided in which the BS 110 transmits one-dimensional configuration information including information on a transmission state and a reflection pattern to the terminal 120 and determines an optimal beam based on this. Here, the one-dimensional information may refer to one piece of information (e.g., (A, B)) that is a combination of the transmission state (e.g., A) of the BS 110 and information (e.g., B) on the reflection pattern of the RIS. It is assumed that the ACI state ID is 2-bit information, the transmission state of the BS 110 is $W_0$ or $W_1$, and the reflection pattern is $\Phi_0$ or $\Phi_1$. The ACI state ID is 2-bit information and may be a value of 0, 1, 2, or 3. For example, when the ACI state ID is 0, information indicated by the ACI state ID may be ($W_0$, $\Phi_0$). When the ACI state ID is 1, information indicated by the ACI state ID may be ($W_0$, $\Phi_1$). When the ACI state ID is 2, information indicated by the ACI state ID may be ($W_1$, $\Phi_0$). When the ACI state ID is 3, information indicated by the ACI state ID may be ($W_1$, $\Phi_1$). The mapping information transmitted from the BS 110 to the terminal 120 may be information on the mapping between the ACI state ID and the RS. For example, in the above assumption, a case in which the ACI state ID is 0 and a case in which the RS is #0 may be mapped to each other. A case in which the ACI state ID is 1 and a case in which the RS is #1 may be mapped to each other. A case in which the ACI state ID is 2 and a case in which the RS is #2 may be mapped to each other. A case in which the ACI state ID is 3 and a case in which the RS is #3 may be mapped to each other. That is, the terminal 120 may determine an optimal beam based on information on the mapping between the ACI state ID and the RS and information (e.g., ACI state ID, duration period, applied start time) on ACI of a scheduled resource.

Figure 8:
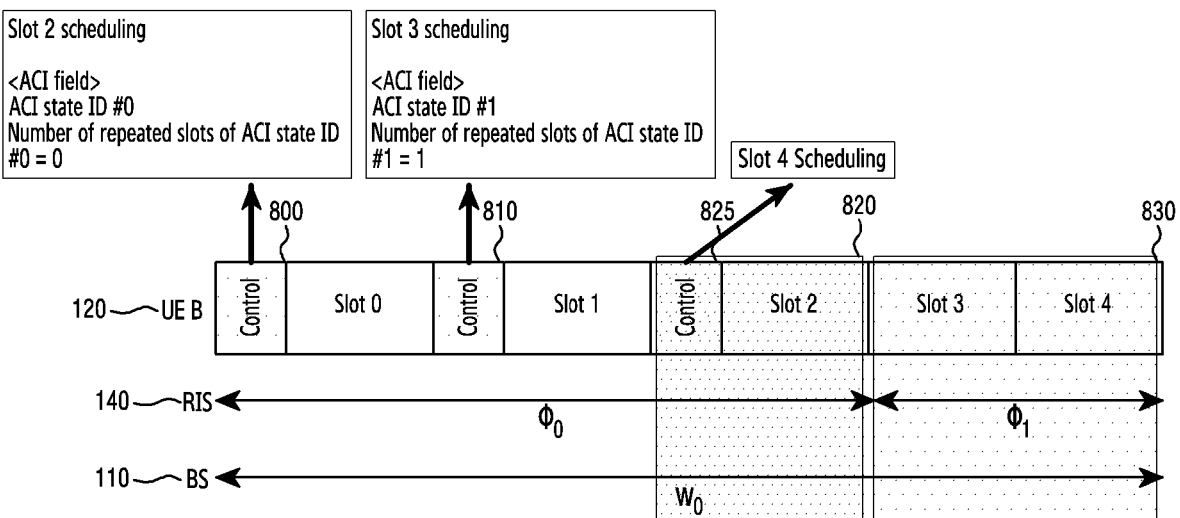
FIG. 8 illustrates a reception state of a terminal that is changed based on information including a reflection pattern according to an embodiment.

FIG. 8 illustrates a reception state of a terminal that is changed based on information including a reflection pattern according to an embodiment. For example, FIG. 8 will be described with reference to the wireless communication environment illustrated in FIG. 1.

In FIG. 8, an optimal reception beam of the terminal 120 is changed based on a transmission beam of the BS 110 and a reflection pattern of the RIS 140. Here, the reception state may refer to a reception state for downlink received by the terminal from the BS. For example, the reception state may refer to the index of the reception beam of the terminal, the power level of the reception beam, and the change period of the reception beam. The reflection pattern may refer to a combination of phase and amplitude values in which a signal reflected by the RIS is changed compared to a signal received by the RIS.

Referring to FIG. 8, the index of the transmission beam of the BS 110 may be $W_0$-in the time interval of the first control signal period 800 to slot 4. The index of the reflection pattern of the RIS 140 in the time interval of the first control signal period 800 to slot 2 820 may be $\Phi$-0, the index of the reflection pattern of the RIS 140 in the time interval of slot 3 and slot 4 830 may be $\Phi$-1.

In FIG. 8, a unit of time interval is illustrated as a slot for convenience of description, but the disclosure is not limited thereto. For example, the unit of time interval may be defined as a symbol (e.g., an OFDM symbol), a slot, a subframe, a half-frame, or a frame or radio frame. In addition, the length of the time interval may vary according to SCS.

The terminal 120 may receive scheduling information for slot 2 from the BS 110 in the first control signal period 800. In this case, the terminal 120 may receive information on ACI together with scheduling information. For example, information on ACI may include information on an ACI state ID and a time interval in which the ACI state ID is maintained. In the example of FIG. 8, the value of information on the time interval in which the ACI state ID is maintained is 0, which may refer to that the ACI state ID is maintained only in one slot (i.e., slot 2) and is not repeated in subsequent time intervals. Accordingly, the terminal 120 may determine an optimal reception beam based on the information on the ACI of the BS 110 in slot 2 820. For example, the terminal 120 may identify that ACI state ID #0 is applied in slot 2 820 through information on ACI. Thereafter, the terminal 120 may identify that the optimal reception beam is $f_0$ for the RS mapped to ACI state ID #0, and by applying this, the terminal 120 may receive a downlink signal from the BS 110.

The terminal 120 may receive scheduling information for slot 3 from the BS 110 in the second control signal period 810. The terminal 120 may receive information on ACI together with scheduling information. In this case, the value of information on the time interval in which the ACI state ID is maintained is 1, which may refer to that the ACI state ID is maintained in the starting slot (i.e., slot 3) and in the next slot (i.e., slot 4). Accordingly, the terminal 120 may determine an optimal reception beam based on the information on the transmission beam and the information on the ACI of the BS 110 in slot 3 and slot 4 830. For example, the terminal 120 may identify that ACI state ID #1 is applied in slot 3 and slot 4 830 through information on ACI. Thereafter, the terminal 120 may identify that the optimal reception beam is $f_1$ for the RS mapped to ACI state ID #1, and by applying this, the terminal 120 may receive a downlink signal from the BS 110.

The terminal 120 may receive scheduling information for slot 4 from the BS 110 in the third control signal period 825. In this case, the terminal 120 may not receive information on ACI. Because information on the ACI received in the second control signal period 810 is maintained even in the interval of slot 4, the terminal 120 may receive only scheduling information from the BS 110.

Figure 9:
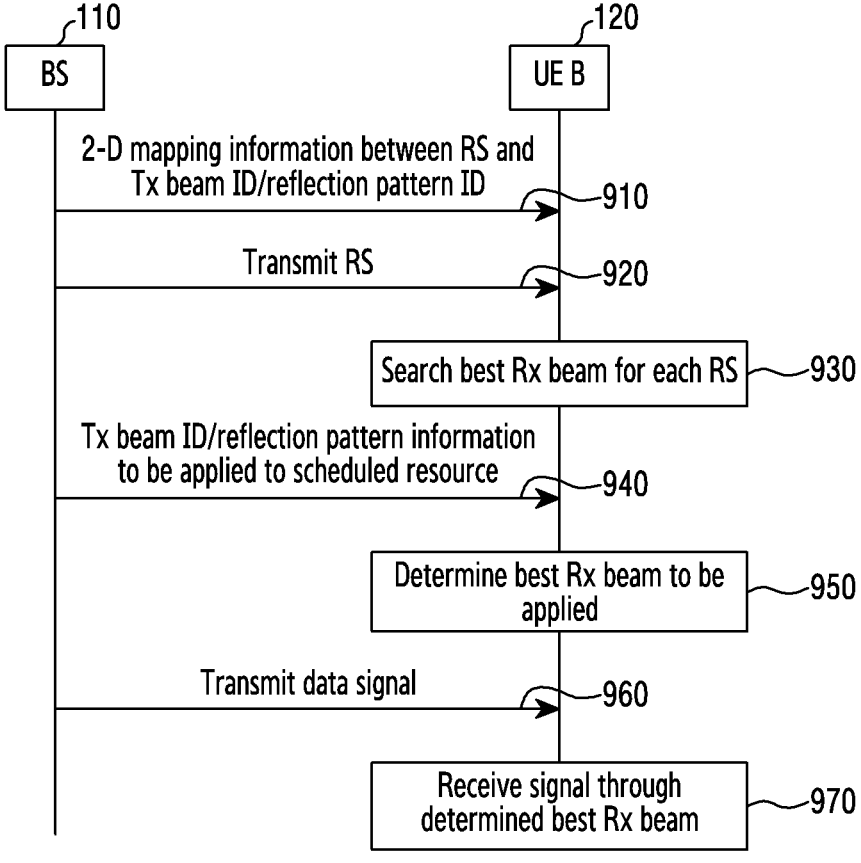
FIG. 9 is a signal flow diagram illustrating a method for determining a reception state of a terminal based on information related to a reflection pattern and a transmission state according to an embodiment.

FIG. 9 is signal flow diagram illustrating a method for determining a reception state of a terminal based on information related to a reflection pattern and a transmission state according to an embodiment. For example, FIG. 9 will be described with reference to the wireless communication environment illustrated in FIG. 1.

In FIG. 9, the transmission state may refer to a transmission state for downlink transmission from the BS 110 to the terminal 120. For example, the transmission state may refer to the index of the transmission beam of the BS 110, the power level of the transmission beam, and the change period of the transmission beam. In addition, the reception state may refer to a reception state for downlink received by the terminal 120 from the BS 110. For example, the reception state may refer to the index of the reception beam of the terminal 120, the power level of the reception beam, and change period of the reception beam.

Referring to FIG. 9, a process of determining a reception beam of the terminal 120 and receiving a signal includes transmitting configuration information including information (e.g., information on the transmission beam) on the transmission state of the BS 110 and information on the reflection pattern of the RIS.

In step 910, the BS 110 transmits configuration information on a mapping between an RS and the transmission state (e.g., the index of the transmission beam) and the index of the reflection pattern to the terminal 120. For example, configuration information transmitted from the BS 110 to the terminal 120 may be transmitted through higher layer signaling, e.g., RRC signaling. In addition, configuration information may be transmitted through DCI. In addition, configuration information may be activated by DCI after being configured through the RRC signaling. For example, the information on the transmission state of the BS 110 may be an index of a transmission beam of the BS. The information on the reflection pattern of RIS may include an index for identifying one of the reflection patterns of the RIS beambook. A reflection pattern value corresponding to a reflection pattern index may include information on a reflection phase and a reflection amplitude. As the BS 110 informs the terminal 120 of mapping information of the ACI state ID applied to each of the at least one RS, the terminal 120 may identify an optimal reception beam corresponding to each RS based on the mapping information. In other words, the terminal 120 may identify an optimal reception beam corresponding to each RS based on information in which the reflection pattern and the transmission state are mapped to a specific RS.

Unlike the method of FIG. 7, the configuration information in FIG. 9 may include at least one of transmission state information and reflection pattern information. In other words, the BS 110 may inform the terminal 120 of the information on the transmission state and the information on the reflection pattern through configuration information that includes individually, rather than in one combination.

In step 920, the BS 110 transmits an RS to the terminal. Here, the RS may refer to a signal for determining a reception beam of the terminal 120. For example, the RS may refer to a CSI-RS, an SSB, a DMRS, etc.

In step 930, the terminal 120 determines an optimal reception beam for each RS through the RS received from the BS 110. For example, the optimal reception beam may be identified based on an RSRP and a threshold value. The threshold value may be preconfigured based on the channel condition. The terminal 120 may identify an optimal reception beam for each RS based on mapping information between the RS, transmission state, and reflection pattern. That is, the terminal 120 may identify an optimal reception beam corresponding to different transmission states and reflection patterns.

In step 940, the BS 110 transmits ACI information to be applied to the scheduled resource to the terminal 120. For example, the BS 110 may transmit information on a transmission state and a reflection pattern applied for each time interval with respect to scheduled resources for the terminal 120. The BS 110 may transmit information on a time interval in which the transmission state is maintained. For example, information on the time interval in which the transmission state is maintained may be the number of maintained time intervals. Here, information on the time interval in which the transmission state is maintained may be referred to as information on the time interval in which the corresponding transmission state is repeated.

The BS 110 may transmit information on the starting time point in which the transmission state is applied. For example, the information on the starting time point to be applied may be indicated through an offset from the current time point. In addition, the BS 110 may transmit information on a time interval in which the reflection pattern is maintained. For example, information on the time interval in which the reflection pattern is maintained may be the number of maintained time intervals. Here, information on the time interval in which the reflection pattern is maintained may be referred to as information on the time interval in which the corresponding reflection pattern is repeated. The BS 110 may transmit information on the starting time point in which the reflection pattern is applied. For example, the information on the starting time point to be applied may be indicated through an offset from the current time point.

In step 950, the terminal 120 determines an optimal reception beam for each time interval based on information on the transmission state and the reflection pattern to be applied to the scheduled resource. For example, the terminal 120 may determine the optimal RX beam for each time interval based on a search result of the optimal RX beam for each RS and information on the transmission state and the reflection pattern to be applied to the scheduled resource.

In step 960, the BS 110 transmits a downlink data signal to the terminal 120.

In step 970, the terminal 120 receives the downlink data signal transmitted from the BS 110 by using the reception beam determined in step 950.

As illustrated in FIG. 9, a method is provided in which the BS 110 transmits two-dimensional configuration information including information on the transmission state and the reflection pattern to the terminal 120 and based on this, the terminal 120 determines an optimal beam. Here, the two-dimensional information may refer to configuration information that separately includes the transmission state of the BS 110 (e.g., A) and information on the reflection pattern of the RIS (e.g., B). It is assumed that the transmission state of the BS 110 is $W_0$ or $W_1$, and the reflection pattern is $\Phi_0$ or $\Phi_1$. For example, when including both transmission state and reflection pattern information, the configuration information may include $(W_0, \Phi_0)$, $(W_0, \Phi_1)$, $(W_1, \Phi_0)$, or $(W_1,$ $\Phi_1$). However, the disclosure is not limited thereto, and may include only transmission state information or reflection pattern information.

The mapping information transmitted from the BS 110 to the terminal 120 may include information on the mapping between the transmission state and the reflection pattern and the RS. In the example of the above assumption, when the transmission beam index is $W_0$, the transmission beam index $W_0$ may be mapped with RS #0 and RS #1, respectively. When the transmission beam index is $W_1$, the transmission beam index $W_1$ may be mapped with RS #2 and RS #3, respectively. When the reflection pattern index is $\Phi_0$, the reflection pattern index $\Phi_0$ may be mapped with RS #0 and RS #2, respectively. When the reflection pattern index is $\Phi_1$, the reflection pattern index $\Phi_1$ may be mapped with RS #1 and RS #3, respectively. That is, the terminal 120 may determine an optimal reception beam based on information on the mapping between the transmission pattern and reflection pattern and the RS, information on the transmission state applied to the scheduled resource, and information on the reflective pattern.

Figure 10A:
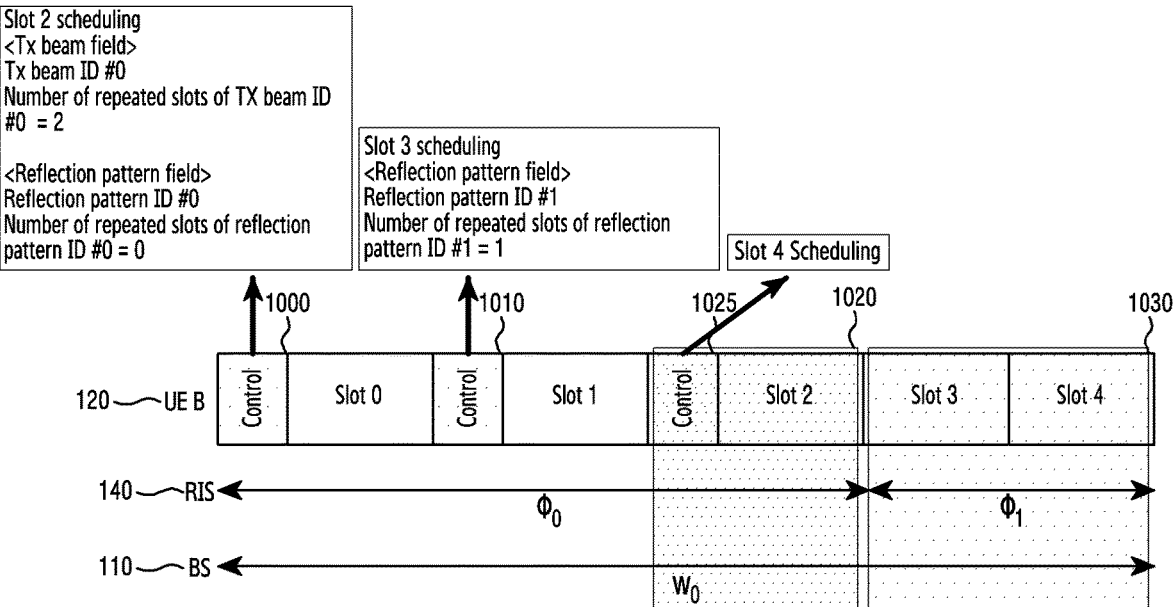
FIG. 10A illustrates a reception state of a terminal that is changed based on information related to a reflection pattern and a transmission state according to an embodiment.

FIG. 10A illustrates a reception state of a terminal that is changed based on information related to a reflection pattern and a transmission state according to an embodiment. For example, FIG. 10A will be described with reference to the wireless communication environment illustrated in FIG. 1.

Specifically, FIG. 10A illustrates a situation in which an optimal reception beam of the terminal 120 is changed based on a transmission beam of the BS 110 and a reflection pattern of the RIS 140. The reception state may refer to a reception state for downlink received by the terminal from the BS 110. For example, the reception state may refer to the index of the reception beam of the terminal 120, the power level of the reception beam, and the change period of the reception beam. The reflection pattern may refer to a combination of phase and amplitude values in which a signal reflected by the RIS 140 is changed compared to a signal received by the RIS 140.

Referring to FIG. 10A, the index of the transmission beam of the BS 110 may be $W_0$-in the time interval of the first control signal period 1000 to slot 4. The index of the reflection pattern of the RIS 140 in the time interval of the first control signal period 1000 to slot 2 1020 may be $\Phi$-0, the index of the reflection pattern of the RIS 140 in the time interval of slot 3 and slot 4 1030 may be $\Phi$-1.

In FIG. 10A, a unit of time interval is illustrated as a slot for convenience of description, but the disclosure is not limited thereto. For example, the unit of time interval may be defined as a symbol (e.g., an OFDM symbol), a slot, a subframe, a half-frame, or a frame or radio frame. In addition, the length of the time interval may vary according to SCS.

The terminal 120 may receive scheduling information for slot 2 from the BS 110 in the first control signal period 1000. In this case, the terminal 120 may receive information on a transmission state and information on a reflection pattern together with scheduling information. For example, information on the transmission state may include information on a transmission beam index (Tx beam ID) and a time interval in which the transmission state is maintained. In the example of FIG. 10A, the value of the information on the time interval in which the transmission state is maintained is 2, which may refer to that the Tx beam ID is maintained in the starting slot (i.e., slot 2) and also up to two subsequent slots (i.e., slots 4) based on the time interval. In addition, the information on the reflection pattern may include information on a reflection pattern index (reflection pattern ID) and a time interval in which the reflection pattern is maintained. In the example of FIG. 10A, the value of information on the time interval in which the reflection pattern is maintained is 0, which may refer to that the reflection pattern ID is maintained only in one slot (i.e., slot 2) and is not repeated in subsequent time intervals. Accordingly, the terminal 120 may determine an optimal reception beam based on information on the transmission beam of the BS 110 and information on the reflection pattern in slot 2 1020. For example, the terminal 120 may identify that Tx beam ID #0 ($W_0$) and reflection pattern ID #0 ($\Phi_0$) are applied in slot 2 1020 based on the information on the transmission beam and the information on the reflection pattern. Thereafter, the terminal 120 may identify that the optimal reception beam is $f_0$ for the RS mapped to the Tx beam ID #0 ($W_0$), and may receive a downlink signal from the BS 110 by applying this.

The terminal 120 may receive scheduling information for slot 3 from the BS 110 in the second control signal period 1010. The terminal 120 may receive information on the reflection pattern together with scheduling information. Unlike the first control signal period 1000, the terminal 120 may receive only information on the reflection pattern. In this case, the value of the information on the time interval in which the reflection pattern is maintained is 1, which may refer to that the reflection pattern ID #1 ($\Phi_1$) is maintained until the next slot (i.e., slot 4) as well as the starting slot (i.e., slot 3). Accordingly, the terminal 120 may determine the optimal reception beam based on information on the transmission state of the BS 110 and information on the reflection pattern in slots 3 and 4 1030. For example, the terminal 120 may identify that the reflection pattern ID #1 is applied in slot 3 and slot 4 1030 through information on the reflection pattern. In addition, the terminal 120 may identify that Tx beam ID #0 ($W_0$), which is the transmission beam of the same BS as before, is applied. Thereafter, the terminal 120 may identify that the optimal reception beam is $f_1$ for the RS mapped to the Tx beam ID #0 ($W_0$) and the reflection pattern ID #1 ($\Phi_1$), and may receive a downlink signal from the BS 110 by applying this.

The terminal 120 may receive scheduling information for slot 4 from the BS 110 in the third control signal period 1025. In this case, the terminal 120 may not receive the information on the transmission state and the information on the reflection pattern. Because the information on the reflection pattern received in the second control signal period 1010 is maintained in the period of slot 4, the terminal 120 may receive only scheduling information from the BS 110.

FIG. 10B illustrates a reception state of a terminal that is changed based on information related to a reflection pattern and a transmission state according to an embodiment. For example, FIG. 10B will be described with reference to the wireless communication environment illustrated in FIG. 1.

Specifically, FIG. 10B illustrates a situation in which an optimal reception beam of the terminal 120 is changed based on a transmission beam of the BS 110 and a reflection pattern of the RIS 140. Here, the reception state may refer to a reception state for downlink received by the terminal 120 from the BS 110. For example, the reception state may refer to the index of the reception beam of the terminal 120, the power level of the reception beam, and the change period of the reception beam. Here, the reflection pattern may refer to a combination of phase and amplitude values in which a signal reflected by the RIS 140 is changed compared to a signal received by the RIS 140.

Referring to FIG. 10B, the index of the transmission beam of the BS 110 may be $W_m$ in the time interval of the first control signal period 1040 to slot 1. The index of the transmission beam of the BS 110 may be $W_0$ in the time interval of slot 2 1060 to slot 3 and slot 4 1070. The index of the reflection pattern of the RIS 140 in the time interval of the first control signal period 1040 to slot 1 may be $\Phi\text{-}_n$, the index of the reflection pattern of the RIS 140 in the time interval of slot 2 1060 may be $\Phi\text{-}_0$, and the index of the reflection pattern of the RIS 140 in the time interval of slot 3 and slot 4 1070 may be $\Phi\text{-}_1$.

In FIG. 10B, a unit of time interval is illustrated as a slot for convenience of description, but the disclosure is not limited thereto. For example, the unit of time interval may be defined as a symbol (e.g., an OFDM symbol), a slot, a subframe, a half-frame, or a frame or radio frame. In addition, the length of the time interval may vary according to SCS.

The terminal 120 may receive scheduling information for slot 2 from the BS 110 in the first control signal period 1040. In this case, the terminal 120 may receive information on a transmission state and information on a reflection pattern together with scheduling information. For example, the information on the transmission state may include information on a transmission beam index (Tx beam ID) and an indicator indicating whether it is a new transmission beam. In the example of FIG. 10B, when the value of the information on the indicator indicating whether it is a new transmission beam is 1, the terminal 120 may identify that the new transmission beam has been applied. In addition, the information on the reflective pattern may include information on an index (reflective pattern ID) of the reflective pattern and an indicator indicating whether it is a new reflective pattern. In the example of FIG. 10B, when the value of the indicator indicating whether it is a new reflection pattern is 1, the terminal 120 may identify that the new reflection pattern has been applied. Accordingly, the terminal 120 may determine an optimal reception beam based on information on the transmission beam of the BS 110 and information on the reflection pattern in slot 2 1060. For example, the terminal 120 may identify that Tx beam ID #0 ($W_0$) and reflection pattern ID #0 ($\Phi_0$) are applied in slot 2 1060 based on the information on the transmission beam and the information on the reflection pattern. Thereafter, the terminal 120 may identify that the optimal reception beam is $f_0$ for the RS mapped to the Tx beam ID #0 ($W_0$), and may receive a downlink signal from the BS 110 by applying this.

The terminal 120 may receive scheduling information for slot 3 from the BS 110 in the second control signal period 1050. The terminal 120 may receive information on the transmission pattern and information on the reflection pattern together with scheduling information. Unlike the first control signal period 1040, the information on the transmission pattern of the terminal 120 may include only information on an indicator indicating whether the transmission beam of the BS applied to slot 3 is a new transmission beam. In this case, the value of the indicator is 0, which may indicate that the new transmission beam is not applied. Accordingly, information on the transmission pattern may not include information on the transmission beam ID, but may include only information on the indicator indicating that it is not a new transmission beam. In addition, the terminal 120 may receive information on the reflection pattern. In this case, the information on the reflective pattern may include information on an index (reflective pattern ID) of the reflective pattern and an indicator indicating whether it is a new reflective pattern. When the value of the indicator indicating whether it is the new reflection pattern is 1, the terminal 120 may identify that the new reflection pattern has been applied. Accordingly, the terminal 120 may determine an optimal reception beam based on the information on the transmission beam and the information on the reflection pattern of the BS 110 in slot 3. For example, the terminal 120 may identify that Tx beam ID #0 ($W_0$) and reflection pattern ID #1 ($\Phi_1$) are applied in slot 3 based on the information on the transmission beam and the information on the reflection pattern. Thereafter, the terminal 120 may identify that the optimal reception beam is $f_1$ for the RS mapped to the Tx beam ID #0 ($W_0$) and the reflection pattern ID #1 ($\Phi_1$), and may receive a downlink signal from the BS 110 by applying this.

The terminal 120 may receive scheduling information for slot 4 from the BS 110 in the third control signal period 1065. The terminal 120 may receive information on the transmission pattern and information on the reflection pattern together with scheduling information. In the third control signal period 1065, the information on the transmission pattern of the terminal 120 may include only information on an indicator indicating whether the transmission beam of the BS applied to slot 4 is a new transmission beam. In this case, the value of the indicator is 0, which may indicate that the new transmission beam is not applied. Accordingly, information on the transmission pattern may not include information on the transmission beam ID, but may include only information on the indicator indicating that it is not a new transmission beam. In addition, the information on the reflection pattern of the terminal 120 may include only information on an indicator indicating whether the reflection pattern of the RIS applied to slot 4 is a new reflection pattern. In this case, the value of the indicator is 0, which may indicate that the new reflection pattern is not applied. Accordingly, information on the reflective pattern may not include information on the reflective pattern ID, but only information on an indicator indicating that it is not a new reflective pattern. Accordingly, the terminal 120 may determine an optimal reception beam based on the information on the transmission beam and the information on the reflection pattern of the BS 110 in slot 4. For example, the terminal 120 may identify that Tx beam ID #0 ($W_0$) and reflection pattern ID #1 ($\Phi_1$) are applied in slot 3 based on the information on the transmission beam and the information on the reflection pattern. Thereafter, the terminal 120 may identify that the optimal reception beam is $f_1$ for the RS mapped to the Tx beam ID #0 ($W_0$) and the reflection pattern ID #1 ($\Phi_1$), and may receive a downlink signal from the BS 110 by applying this.

As described above, in the case of FIG. 10B, unlike FIG. 10A, signaling overhead may be reduced by transmitting information on an indicator indicating that the transmission beam of the BS 110 and the reflection pattern of the RIS 140 are changed. For example, when the value of the indicator indicates that the transmission beam or reflection pattern is changed, the BS 110 may further include a changed transmission beam ID or a changed reflection pattern ID to transmit information on the transmission pattern or information on the reflection pattern to the terminal. In contrast, when the value of the indicator indicates that the transmission beam or reflection pattern is not changed, this refers to that the transmission beam or reflection pattern of the previous time interval is maintained, and the BS 110 may transmit only transmission pattern information or reflection pattern information not including the transmission beam ID or reflection pattern ID to the terminal 120.

FIG. 10B defines change when the value of the indicator is 0 and no change when the value of the indicator is 1, but the disclosure is not limited thereto. For example, it is possible to define change when the value of the indicator is 0, and no change when the value of the indicator is 1. In addition, the value of the indicator may be transmitted through more bits than 1 bit. Accordingly, when the indicator is changed, the changed transmission beam ID or reflection pattern ID may be indicated at once by indicating an offset value with respect to the previous transmission beam ID or reflection pattern ID.

In accordance with the above-described embodiments, a method and device are provided for determining a beam based on a reflection pattern by determining a reception beam of a terminal considering a channel change by an RIS. In particular, the disclosure provides a process in which the BS transmits information on the transmission state (e.g., a transmission beam) of the BS, mapping information between the information on the reflection pattern of the RIS and the RS, and information on the transmission pattern and reflection pattern to the terminal, and based on this, the terminal determines the reception beam.

Accordingly, the disclosure may improve communication performance by selecting an optimal beam while more dynamically adapting to a channel change. In addition, when the BS transmits information on the transmission pattern and the reflection pattern to the terminal, by indicating whether to change through the transmitted information, the disclosure may reduce the overhead of signaling between the BS and the terminal.

In addition, the effects obtainable through the disclosure are not limited to the effects mentioned above, and other effects not mentioned may be clearly understood by those skilled in the art from the description below.

A method performed by a UE in a wireless communication system according to an embodiment of the disclosure may include receiving mapping information between a combination of a reflection pattern and a transmission beam of a BS and an RS from the BS; receiving scheduling information including information on a channel state corresponding to the combination of the reflection pattern and the transmission beam of the BS; identifying a reception beam based on at least one RS received from the BS, the mapping information, and the scheduling information; and receiving a downlink signal from the BS through the reception beam, and the reflection pattern may be related to an RIS.

The reflection pattern may include information on the amplitude and phase of a signal reflected by the RIS.

The mapping information may include an ID for a channel state, and the ID for the channel state may be determined based on a combination of the reflection pattern and the transmission beam of the BS.

The mapping information may include at least one of an ID corresponding to a reflection pattern and an ID corresponding to the transmission beam of the BS.

The scheduling information may include information on at least one channel state, and each of the information on the at least one channel state may include information on an ID related to a channel state corresponding to the combination of the reflection pattern and the transmission beam of the BS; and information on a reflection pattern ID of the RIS applied to a time interval in which the downlink signal in which the ID related to the channel state is maintained and a time at which the reflection pattern ID of the RIS is repeated.

A method performed by a BS in a wireless communication system according to an embodiment may include transmitting mapping information between a combination of a reflection pattern and a transmission beam of a BS and an RS to a UE; transmitting scheduling information including information on a channel state corresponding to the combination of the reflection pattern and the transmission beam of the BS; transmitting an RS to the UE; and transmitting a downlink signal to the UE, and the downlink signal may be related to a reception beam of the UE identified based on the mapping information and the scheduling information, and the reflection pattern may be related to an RIS.

The reflection pattern may include information on the amplitude and phase of a signal reflected by the RIS.

The mapping information may include an ID for a channel state, and the ID for the channel state may be determined based on a combination of the reflection pattern and the transmission beam of the BS.

The mapping information may include at least one of an ID corresponding to a reflection pattern and an ID corresponding to the transmission beam of the BS.

The scheduling information may include information on at least one channel state, and each of the information on the at least one channel state may include information on an ID related to a channel state corresponding to the combination of the reflection pattern and the transmission beam of the BS; and information on the time in which the ID related to the channel state is maintained.

A UE in a wireless communication system according to an embodiment of the disclosure may include a transceiver; and at least one processor connected to the transceiver, and the at least one processor may be configured to receive mapping information between a combination of a reflection pattern and a transmission beam of a BS and an RS from the BS; receive scheduling information including information on a channel state corresponding to the combination of the reflection pattern and the transmission beam of the BS; identify a reception beam based on at least one RS received from the BS, the mapping information, and the scheduling information; and receive a downlink signal from the BS through the reception beam, and the reflection pattern may be related to an RIS.

The reflection pattern may include information on the amplitude and phase of a signal reflected by the RIS.

The mapping information may include an ID for a channel state, and the ID for the channel state may be determined based on a combination of the reflection pattern and the transmission beam of the BS.

The mapping information may include at least one of an ID corresponding to a reflection pattern and an ID corresponding to the transmission beam of the BS.

The scheduling information may include information on at least one channel state, and each of the information on the at least one channel state may include information on an ID related to a channel state corresponding to the combination of the reflection pattern and the transmission beam of the BS; and information on the time in which the ID related to the channel state is maintained.

A BS in a wireless communication system according to an embodiment of the disclosure may include a transceiver; and at least one processor connected to the transceiver, and the at least one processor may be configured to transmit mapping information between a combination of a reflection pattern and a transmission beam of a BS and an RS to a UE; transmit scheduling information including information on a channel state corresponding to the combination of the reflection pattern and the transmission beam of the BS; transmit an RS to the UE; and transmit a downlink signal to the UE, and the downlink signal may be related to a reception beam of the UE identified based on the mapping information and the scheduling information, and the reflection pattern may be related to an RIS.

The reflection pattern may include information on the amplitude and phase of a signal reflected by the RIS.

The mapping information may include an ID for a channel state, and the ID for the channel state may be determined based on a combination of the reflection pattern and the transmission beam of the BS.

The mapping information may include at least one of an ID corresponding to a reflection pattern and an ID corresponding to the transmission beam of the BS.

The scheduling information may include information on at least one channel state, and each of the information on the at least one channel state may include information on an ID related to a channel state corresponding to the combination of the reflection pattern and the transmission beam of the BS; and information on the time in which the ID related to the channel state is maintained.

Methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof

What is claimed is:

1. A method performed by a user equipment (UE) in a wireless communication system, the method comprising:
receiving, from a base station (BS), mapping information between identifiers (IDs) for a channel state and a at least one reference signal (RS), wherein the IDs for the channel state correspond to a combination of a reflection pattern of a reconfigurable intelligent surface (RIS) and a transmission beam of the BS;
receiving, from the BS, scheduling information including information on a time interval in which the IDs for the channel state are applied;
receiving, from the BS, the at least one RS;
identifying a reception beam for the time interval based on the at least one RS, the mapping information, and the scheduling information; and
receiving, from the BS using the reception beam of the UE, a downlink signal.

2. The method of claim 1, wherein the reflection pattern includes information on an amplitude and a phase of a signal reflected by the RIS.

3. The method of claim 1, wherein the mapping information includes at least one of the IDs corresponding to the reflection pattern or the IDs corresponding to the transmission beam of the BS.

4. The method of claim 1,
wherein the scheduling information further includes information on an ID associated with the IDs for the channel state.

5. A method performed by a base station (BS) in a wireless communication system, the method comprising:
transmitting, to a user equipment (UE), mapping information between identifiers (IDs) for a channel state and at least one reference signal (RS), wherein the IDs for the channel state correspond to a combination of a reflection pattern of a reconfigurable intelligent surface (RIS) and a transmission beam of the BS;
transmitting, to the UE, scheduling information including information on a time interval in which the IDs for the channel state are applied;
transmitting, to the UE, the at least one RS; and
transmitting, to the UE, a downlink signal,
wherein the downlink signal is associated with a reception beam for the time interval, and
wherein the reception beam of the UE is identified based on the at least one RS, the mapping information, and the scheduling information.

6. The method of claim 5, wherein the reflection pattern includes information on an amplitude and a phase of a signal reflected by the RIS.

7. The method of claim 5, wherein the mapping information includes at least one of the IDs corresponding to the reflection pattern or the IDs corresponding to the transmission beam of the BS.

8. The method of claim 5,
wherein the scheduling information further includes information on an ID associated with the IDs for the channel state.

9. A user equipment (UE) in a wireless communication system, the UE comprising:
a transceiver; and
a controller coupled with the transceiver, and configured to:
receive, from a base station (BS), mapping information between identifiers (IDs) for a channel state and a at least one reference signal (RS), wherein the IDs for the channel state correspond to a combination of a reflection pattern of a reconfigurable intelligent surface (RIS) and a transmission beam of the BS, receive, from the BS, scheduling information including information on a time interval in which the IDs for the channel state are applied, receive, from the BS, the at least one RS, identify a reception beam for the time interval, based on the at least one RS, the mapping information, and the scheduling information, and receive, from the BS using the reception beam of the UE, a downlink signal.

10. The UE of claim 9, wherein the reflection pattern includes information on an amplitude and a phase of a signal reflected by the RIS.

11. The UE of claim 9, wherein the mapping information includes at least one of the IDs corresponding to the reflection pattern or the IDs corresponding to the transmission beam of the BS.

12. The UE of claim 9, wherein the scheduling information further includes information on an ID associated with the IDs for the channel state.

13. A base station (BS) in a wireless communication system, the BS comprising:

a transceiver; and a controller coupled with the transceiver, and configured to:

transmit, to a user equipment (UE), mapping information between identifiers (IDs) for a channel state and a at least one reference signal (RS), wherein the IDs for the channel state correspond to a combination of a reflection pattern of a reconfigurable intelligent surface (RIS) and a transmission beam of the BS, transmit, to the UE, scheduling information including information on a time interval in which the IDs for the channel state are applied, transmit, to the UE, the at least one RS, and transmit, to the UE, a downlink signal, wherein the downlink signal is associated with a reception beam for the time interval, and wherein the reception beam of the UE is identified based on the at least one RS, the mapping information, and the scheduling information.

14. The BS of claim 13, wherein the reflection pattern includes information on an amplitude and a phase of a signal reflected by the RIS.

15. The BS of claim 13, wherein the mapping information includes at least one of the IDs corresponding to the reflection pattern or the IDs corresponding to the transmission beam of the BS.

16. The BS of claim 13, wherein the scheduling information further includes information on an ID associated with the IDs for the channel state.

* * * * *